United States Patent [19]

Dorchak

[11] Patent Number: 5,161,110
[45] Date of Patent: Nov. 3, 1992

[54] HIERARCHICAL PROCESS CONTROL SYSTEM AND METHOD

[75] Inventor: Wayne A. Dorchak, Plano, Tex.

[73] Assignee: Atlantic Richfield Company, Los Angeles, Calif.

[21] Appl. No.: 485,425

[22] Filed: Feb. 27, 1990

[51] Int. Cl.⁵ .............................................. G06F 15/46
[52] U.S. Cl. .................................. 364/468; 364/131; 364/551.01
[58] Field of Search ............... 364/131, 139, 152, 153, 364/468, 550, 551.01, 276, 283.2, 921.8; 395/650, 10, 11, 52

[56] References Cited

U.S. PATENT DOCUMENTS

| | | | |
|---|---|---|---|
| 4,347,564 | 8/1982 | Sugano et al. | 364/132 |
| 4,672,529 | 6/1987 | Kupersmit | 364/130 |
| 4,707,778 | 11/1987 | Yamada et al. | 364/132 |
| 4,827,423 | 5/1989 | Beasley et al. | 364/468 |
| 4,895,518 | 1/1990 | Arnold et al. | 434/118 |
| 4,907,167 | 3/1990 | Skeirik | 364/500 |
| 4,967,337 | 10/1990 | English et al. | 364/184 |
| 4,975,827 | 12/1990 | Yonezawa | 364/151 |
| 4,975,865 | 12/1990 | Carrette et al. | 364/513 |
| 5,006,992 | 4/1991 | Skeirik | 364/513 |

OTHER PUBLICATIONS

David Gelernter, "The Metamorphosis of Information Management", published in Scientific American, Aug. 1989, pp. 66–73.

Primary Examiner—Jerry Smith
Assistant Examiner—Paul Gordon
Attorney, Agent, or Firm—Baker & Botts

[57] ABSTRACT

The present invention relates to a real-time hierarchical process control system. The system comprises a multiple-level architecture, each level including a monitor for receiving and monitoring a plurality of input signals. The monitor produces a first request if at least one input signal exceeds a predetermined range. A guardian receives the first request, issues a second request and determines a course of action to take. A consultant receives the second request, performs an analysis and produces information for aiding the determination of a course of action.

34 Claims, 3 Drawing Sheets

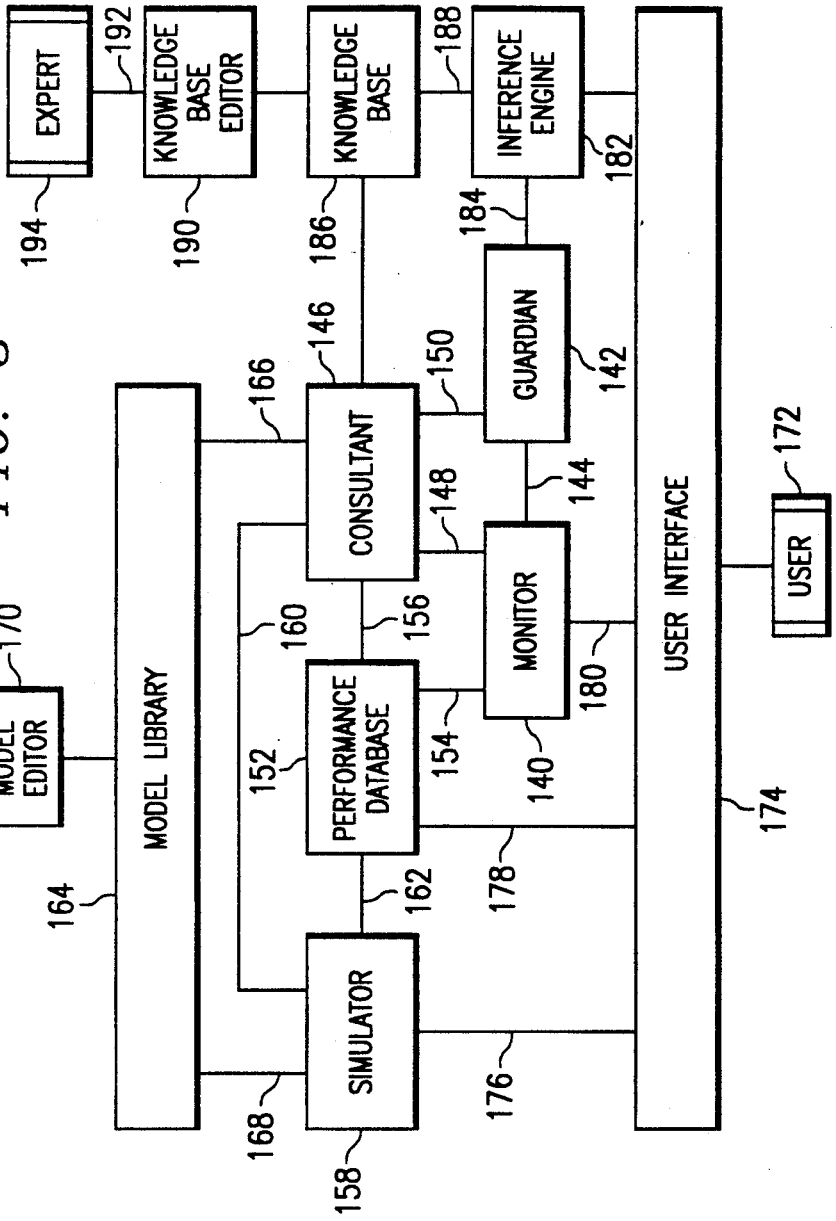
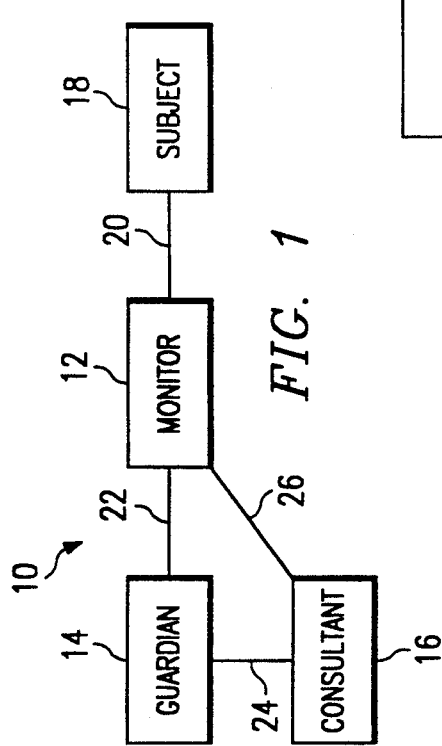

HIERARCHICAL PROCESS CONTROL SYSTEM AND METHOD

TECHNICAL FIELD OF THE INVENTION

This invention relates generally to the field of control systems, and more particularly to a hierarchical process control system which incorporates artificial intelligence and a method for performing the same.

BACKGROUND OF THE INVENTION

In a processing or manufacturing facility, the managers, supervisors and operators control and monitor the equipment and processes of the facility in a hierarchical fashion. For example, an operator may run equipment 1 through equipment k, while another may run equipment k+1 through equipment n in the same process. Each operator must be knowledgeable in the operation of each piece of equipment, such as the optimal operating temperature range, the maximum liquid intake amount, etc. The operators must also have the ability to spot any trend in the performance of the equipment which may signal future problems. In the event that a piece of equipment is down for any reason, the operator must take steps to diagnose the problem and contact additional personnel to repair the equipment if required.

The supervisor of the process, which typically includes the operation of more than one piece of equipment, is involved with the operations of the process. A supervisor determines, for example, when the down time of one piece of equipment requires its operator to put in double shifts in order to keep up production. The supervisor, like the operator, must possess vast knowledge and experience related to his area of responsibility in order to make educated decisions. A manager, who has domain over the facility, which may include more than one process, must be knowledgeable in facility operations as well as the performance goals of the facility. It is therefore not surprising that it may take an operator, a supervisor or a manager numerous years to accumulate the amount of experience necessary to proficiently perform all of his duties. Accordingly, it is a costly process to train and retrain personnel.

More specifically, in facilities related to oil and gas production and processing, there exists a hierarchy of equipment and processes. For example, in oil production, a production center controls and monitors the production of a plurality of well sites, each of which may include one or more oil producing wells. The oil from each well flows into a tank battery or is pumpted thereto by pumping units. Parameters such as the flow rate and oil temperature are monitored to ensure and maintain the oil production of each well. Additionally, the production of a group of oil wells, which produce oil for a tank battery, is monitored.

In oil and gas processing, the oil obtained from oil wells are processed by oil separation, gas conditioning and produced water handling processes. Each process is performed by operating a number of pieces of equipment such as vessel containers, heat exchangers and pumps, the operation of each being monitored and controlled by operators.

A hierarchical process control system and method is described in detail below that mimics the human manager-supervisor-operator hierarchy operating on the facility, process and equipment levels. The hierarchical process control system and method is applicable to processing and manufacturing facilities alike, such as the oil and gas related facilities described above in addition to traditional manufacturing environments. In addition, monitor and control tools, such as artificial intelligence, simulators and statistical analysis, are used to operate on current operating data as well as data stored in databases. The process control system may be generic at the equipment level, except for the data contained in each of the databases, so that large portions of the system are portable to other facilities. The hierarchical process control system may be instituted incrementally or partially in a facility by implementing those processes or groups of processes which would benefit most from such implementation.

The present invention provides for a hierarchical process control system and method and is directed to overcoming one or more of the problems as set forth above.

SUMMARY OF THE INVENTION

In accordance with the present invention, a hierarchical process control system is provided which substantially eliminates or reduces disadvantages and problems associated with prior control systems.

In one aspect of the present invention, a real-time hierarchical process control system is provided. The system comprises a multiple-level architecture, each level including a monitor for receiving and monitoring a plurality of input signals. The monitor produces a first request if at least one input signal is not within a predetermined range. A guardian receives the first request and determines a course of action to take. The guardian may also issue a second request. A consultant receives the second request, performs an analysis and produces information for aiding the determination of a course of action.

In another aspect of the present invention, a real-time hierarchical process control system comprises at least one first level controller for monitoring and controlling a plurality of input signals measured from a subject. Further, at least one second level controller is coupled to at least one first level controller for monitoring and controlling the first level controller, and a third level controller is coupled to at least one second level controller for monitoring and controlling the second level controller.

An important technical advantage of the present invention includes the capability of monitoring and controlling a facility in real time. Equipment, process and facility operators can be alerted as soon as their attention is required. In addition, because expert knowledge of equipment, processes and facility is preserved in various knowledge bases and databases, immediate action may be taken to correct certain faulty situations. This ability reduces the possibility of equipment down time in the facility.

Another important technical advantage of the present invention provides for simulation and statistical analysis which are performed to foresee future problems so that steps may be taken to modify the course of the operation to avoid them.

Another important technical advantage of the process control system includes the modularity and portability of the components in the system. Most software at the lower levels and hardware may be generic so that implementation may take place quickly.

Yet another important technical advantage is the ability of the system components to make use of any artificial intelligence tools to diagnose any problem on hand. For example, knowledge-based expert systems, neural networks, pattern recognition and fuzzy logic may be used for problem solving.

Yet another important technical advantage of the present invention provides for the ability to implement the hierarchical process control system, incrementally or partially, in selected processes or groups of processes in a facility.

BRIEF DESCRIPTION OF THE DRAWINGS

For a better understanding of the present invention, reference may be made to the accompanying drawing, in which:

FIG. 1 is a block diagram of a control module in accordance with a preferred embodiment of the hierarchical process control system;

FIG. 3 is a block diagram of the control module and additional peripheral devices.

DETAILED DESCRIPTION OF THE INVENTION

Figure 2:
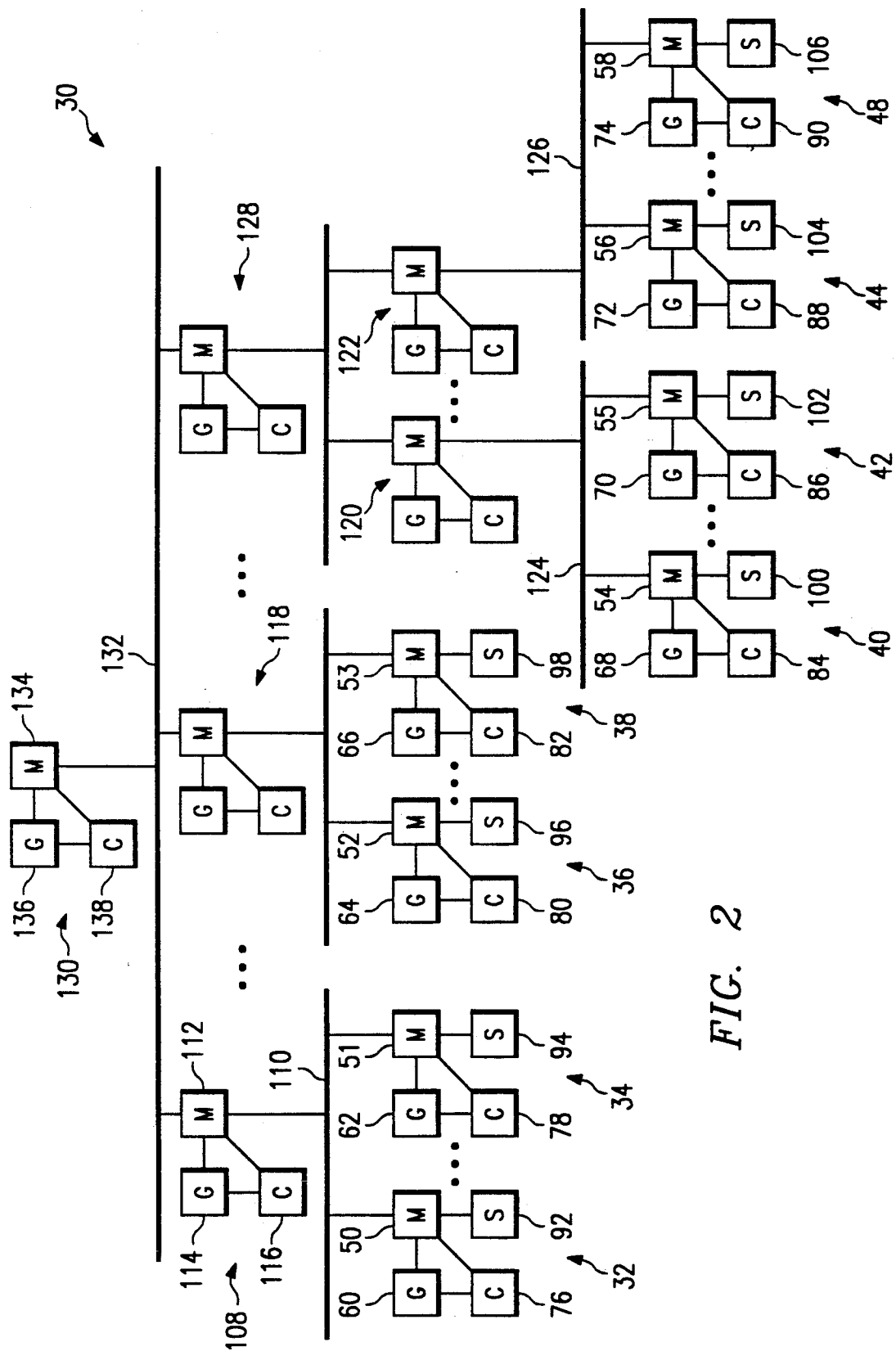
FIG. 2 is a block diagram showing a hierarchical structure in accordance with the preferred embodiment of the present system.

The hierarchical process control system in accordance with the present invention includes a control module 10 shown in FIG. 1. Control module 10 is the building block upon which the system is based. Control module 10 is present in all levels of the hierarchical process control system and consists of three basic units: a monitor 12, a guardian 14 and a consultant 16. These units are so named because of their assigned functions, which will be more apparent from the discussion below.

Monitor 12 periodically receives a plurality of input signals from a subject 18 via a connection 20 and makes comparisons with predetermined operating ranges to ensure the satisfactory operation of subject 18. The input signals may include parameters sensed from subject 18 such as temperature, fluid levels, and operating speeds. The input signals may additionally include alarm signals, such as signals which are produced when a parameter has deviated excessively from normal. In general, alarm signals demand immediate attention. Subject 18 may be a piece of equipment, such as a compressor; a process, such as a distillation process which includes a number of pieces of equipment; or a facility which includes a number of processes. If monitor 12 detects that one or more input signals from subject 18 are out of range or exhibit signs that forecast a problem, guardian 14 is notified via a connection 22.

Guardian 14 is presented with a request from monitor 12 to ascertain the status of subject 18 and to prescribe a course of action, if necessary. In order to make these determinations, guardian 14 may use a number of artificial intelligence tools such as a knowledge-based expert system, a neural network, fuzzy logic and the like. In addition to the artificial intelligence tools, guardian 14 may request assistance from consultant 16.

Consultant 16 receives a request for assistance from guardian 14 via a connection 24. Consultant 16 may act as an advisor to guardian 14 by performing rigorous computations relating to control theory, including trend analysis and simulation of performance parameters. Consultant 16 may also apply optimization methods to generate optimum operating conditions. If necessary, monitor 12 may bypass guardian 14 and call upon consultant 16 directly, using a connection 26, as shown in FIG. 1.

Referring to FIG. 2, a hierarchical process control system 30 constructed with a plurality of control modules in accordance with the present invention is shown. Hierarchical process control system 30 includes three main control levels: the facility level, the process level and the equipment level. However, hierarchical process control system 30 may be composed of more than three control levels, including sub-processes and sub-equipment levels.

At the lowest level, equipment control modules 32-48, consisting of monitors 50-58, guardians 60-74 and consultants 76-90, respectively, monitor and control equipment 92-106, respectively. Each control module 32-48 ensures satisfactory operation of its subject equipment 92-106, but has no knowledge of the existence of other equipment and control modules. In other words, each control module 32-48 operates independently in the monitor and control of equipment 92-106.

Because they cooperate in some fashion, certain pieces of equipment may be grouped together. A process may be defined as the operation of at least two pieces of equipment to achieve a predetermined end result. The control modules of these pieces of equipment are monitored and controlled by a control module on the process level. For example, equipment control modules 32-34 are coupled to a process control module 108 via a network or bus 110. More specifically, monitors 50-51 of control modules 32-34 on the equipment level are coupled to a monitor 112 on the process level. The structure and function of process control module 108 are comparable to the structure and function of control modules on the equipment level, except that on the process level the control subject is not a piece of equipment, but a process.

Process control module 108 includes monitor 112 interconnected with a guardian 114 and a consultant 116. Monitor 112 receives a plurality of input signals from monitors 50-51 and compares them with predetermined criteria, then issues requests to guardian 114 and/or consultant 116 to determine a course of action, if required. For example, if the input signals show that equipment 92 is malfunctioning for some reason, the artificial intelligence in guardian 114 and/or the computations in consultant 116 may determine that the operation of equipment 94 should be halted until the problem with equipment 92 is resolved. Monitor 112 may subsequently issue a request to monitor 94 to halt equipment 94.

Similarly, a process control module 118 monitors and controls equipment control modules 36 to 38. Control modules 120 to 122, on the other hand, are sub-process control modules. Sub-process control modules may be required where a process is unusually complex and/or includes a large number of equipment that dictate a natural sub-division. Sub-process control modules 120 and 122 are coupled to equipment control modules 40-42 and 44-48, respectively, through networks or buses 124 and 126. Sub-process control modules 120 to 122, in turn, are controlled and monitored by a control module 128 on the process level.

The highest level in the hierarchy is the facility level. A facility may be defined as a system of ongoing processes that cooperate in some fashion. A facility control module 130 is coupled to all the process level control modules 108, 118 and 128 via a network or bus 132. Facility control module 130 includes a monitor 134, a guardian 136 and a consultant 138, and ensures the satisfactory operation of the facility. Facility level monitor 134 receives a plurality of input signals from process level control modules 108, 118 and 128 and compares them with some predetermined criteria to ensure satisfactory facility operation. Monitor 134 may request services from guardian 136 and/or consultant 138 to evaluate the situation.

FIG. 3 illustrates the architecture of a control module showing, additionally, the peripheral tools and databases. Note that the control subject is not shown. A monitor 140 is connected to a guardian 142 via a connection 144, and to a consultant 146 via a connection 148. Guardian 142 is further connected to consultant 146 via a connection 150. Monitor 140 is capable of accessing a performance database 152 through a link 154. Performance database 152 contains a sequential collection of input signals gathered from the control subject. The data in performance database 152 may describe operating conditions in which the subject functioned properly, in addition to conditions in which the subject functioned improperly. Consultant 146 may also access the data in performance database 152 through a connection 156. A simulator 158, coupled to consultant 146 via a link 160, may be activated to simulate the operations of the subject under certain operating conditions in order to predict a resultant condition. Simulator 158 may access the data stored in performance database 152 via a link 162.

Detailed specifications of the subject are stored in a model library 164. Model library 164 is coupled to consultant 146 and simulator 158 via connections 166 and 168, respectively. A model editor 170 coupled to model library 164 may be used by a user 172 to edit the contents of model library 164. User 172 may also edit and/or access parts of the control module via a user interface 174. User interface 174 is linked to simulator 158 through a connection 176; to performance database 152 via a link 178; and to monitor 140 via a connection 180.

In the preferred embodiment of the present invention, guardian 142 has access to any problem-solving artificial intelligence tool, such as knowledge-based expert systems, fuzzy logic, neural networks and the like. FIG. 3 shows guardian 142 coupled to a knowledge-based expert system. Guardian 142 is coupled to the inference engine 182 via a connection 184. Inference engine 182 is coupled to the knowledge base 186 through a connection 188. Knowledge base 186 is coupled to a knowledge-base editor 190 via a connection 192 so that an expert 194 may enter and/or edit knowledge base 186.

An expert system used by the present invention is a rule-based problem-solving tool that includes an inference engine and a knowledge base containing a set of rules. In the simplest form, the rules are if-then-else statements incorporating expert knowledge which provide possible solutions. More elaborate schemes are available and can be used. The inference engine drives the firing of the rules, which may be in the form of forward or backward chaining. In addition, a confidence factor may be assigned to each solution to indicate the degree of certainty in the solution offered. A neural network may also be used by the present invention to detect patterns which may be present in the input signals to aid in the determination of the status of the control subject.

Figure 4:
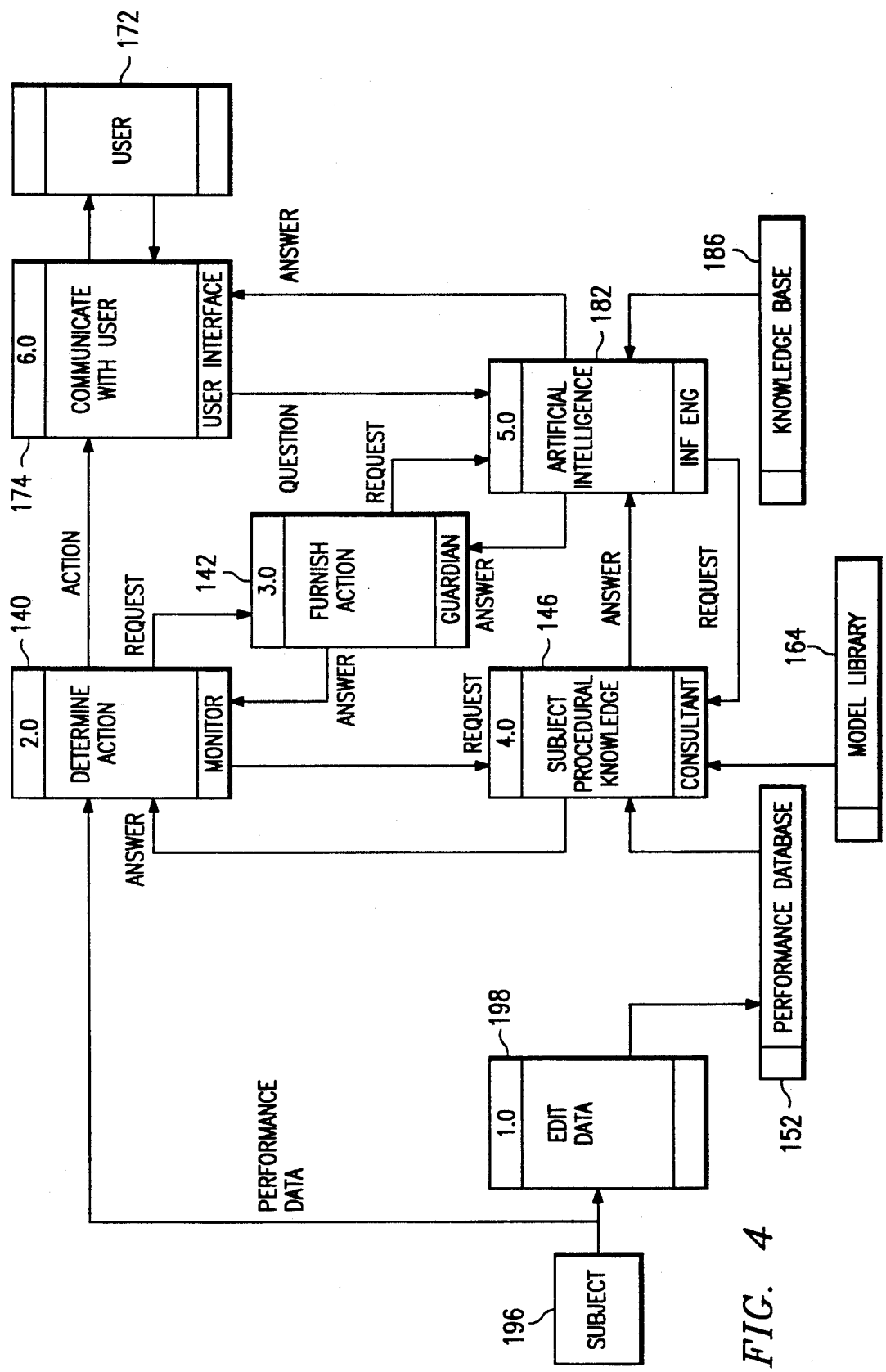
FIG. 4 is a data flow diagram showing the flow of data between the control module and additional peripheral devices.

In operation, a control module functions in real time and is actively involved in the monitoring and controlling of a piece of equipment, a process or a facility. Referring to FIG. 4, the data flow between various components of a control module is shown. The operation of a subject 196 is monitored and input signals including performance data are collected. The performance data may be edited in block 198 and subsequently stored in performance database 152. Additionally, the performance data are also received by monitor 140, where the performance data are compared to a set of predetermined operating ranges. If an operation abnormality is detected, monitor 140 immediately issues a request to guardian 142 for a remedial course of action. Monitor 140 may also issue a request to consultant 146, where data analysis may be performed to determine whether a problem exists.

Guardian 142, after receiving the request from monitor 140, activates inference engine 182 where, currently, rule-based problem-solving techniques are used to determine the proper action to take. Inference engine 182 accesses knowledge base 186 and may additionally issue a request to consultant 146 if its services are required.

Consultant 146 may access performance database 152 and/or model library 164 to obtain additional information on subject performance history and/or specifications. Consultant 146, with the information obtained, performs rigorous computations to aid in the determination of a solution.

Finally, monitor 140 receives an answer from guardian 142 or consultant 146, which allows it to determine the proper action to take under the current conditions. The assistance of a user may be required to take action, therefore monitor 140 communicates to a user interface 174 so that a user 172 may be alerted. If desired, user 172 may request the reasoning behind the determination of the action, whereupon inference engine 182 presents to user 172 the rule or rules that led to the final determination.

Constructed in this manner, the equipment, process and facility control modules may consist of substantial quantities of generic software and hardware for the monitor, guardian and consultants. User interface, editor and database software may also be generic. Therefore, the components which may vary among control modules is the knowledge in the knowledge-based expert system or other artificial intelligence tools and the data in various databases. For common subjects, for example pump A in facility B and pump C in facility D, the control modules may be identical. For the above reasons, a hierarchical process control system may be quickly implemented on the equipment, process and equipment levels in a facility.

In addition to the generic nature of certain components of the hierarchical process control system, modularity is another advantageous feature of the present system. The hierarchical process control system may be instituted partially to control selected processes in a facility. If preferred, the system may then be implemented incrementally to gradually control the entire facility.

Although the present invention has been described in detail, it should be understood that various changes, substitutions and alterations can be made hereto without departing from the spirit and scope of the invention as defined by the appended claims.

What is claimed is:

1. A real-time hierarchical process control system comprising:
   a monitor for receiving and monitoring a plurality of input signals, said monitor producing a first request if at least one input signal exceeds a predetermined range;
   a guardian for receiving said request and determining a course of action, said guardian producing a second request; and
   a consultant for receiving said second request, performing an analysis and producing information for aiding said determination of a course of action.

2. The system, as set forth in claim 1, wherein said monitor produces a third request and said consultant receives said third request, performs an analysis and produces information for aiding said determination of a course of action.

3. The system, as set forth in claim 1, wherein said monitor is coupled to a subject, said plurality of input signals originating from said subject.

4. The system, as set forth in claim 1, wherein said monitor, guardian and consultant control a piece of equipment, said equipment being coupled to a plurality of sensors producing said plurality of input signals.

5. The system, as set forth in claim 4, wherein said monitor, guardian and consultant control a process, said process including the operation of a plurality of equipment, and said process monitor being coupled to said plurality of equipment monitors, said plurality of equipment monitors producing said plurality of input signals received by said process monitor.

6. The system, as set forth in claim 5, wherein said monitor, guardian and consultant control a facility, said facility including the operation of a plurality of processes, and said facility monitor being coupled to said plurality of process monitors, said plurality of process monitors producing said plurality of input signals received by said facility monitor.

7. The system, as set forth in claim 6, further comprising a knowledge base containing knowledge pertaining to one of an equipment, a specific process and a specific facility.

8. The system, as set forth in claim 7, wherein said guardian accesses knowledge stored in said knowledge base.

9. The system, as set forth in claim 7, wherein said consultant accesses knowledge stored in said database.

10. The system, as set forth in claim 6, further comprising a performance history database containing performance history pertaining to one of an equipment, a specific process and a specific facility.

11. The system, as set forth in claim 10, wherein said consultant accesses performance history stored in said performance history database.

12. The system, as set forth in claim 11, wherein said consultant performs analytic computations such as trend analysis, simulation, optimization and the like.

13. A real-time hierarchical process control method, comprising the steps of:
   monitoring a first plurality of input signals originating from at least one first level subject, said first level subject being part of a second level subject;
   monitoring a second plurality of input signals originating from said second level subject, said second level subject being part of a third level subject;
   monitoring a third plurality of input signals originating from said third level subject;
   recognizing a problem if one or more input signals from said first, second and third level subjects fail predetermined criteria;
   diagnosing said recognized problem; and
   advising a recommended course of action.

14. The method, as set forth in claim 13, wherein said diagnosing step comprises the steps of:
   applying a set of pre-established rules;
   accessing a database containing knowledge pertaining to one of said first, second and third level subjects.

15. The method, as set forth in claim 13, wherein said diagnosing step comprises the steps of:
   accessing a database containing performance history pertaining to one of said first, second and third level subjects;
   performing an analysis on said data.

16. A real-time hierarchical process control system comprising:
   at least one first level controller for monitoring a first plurality of input signals received from a subject and for controlling said subject;
   said first level controller including:
   a monitor coupled to a plurality of sensors for receiving and monitoring said input signals from said sensors, said monitor producing a first request if at least one input signal fails a predetermined criteria; and
   a guardian for receiving said first request and determining a course of action;
   at least one second level controller coupled to at least one first level controller for monitoring a second plurality of input signals received therefrom and controlling said first level controller; and
   a third level controller coupled to at least one second level controller for monitoring a third plurality of input signals received therefrom and controlling said second level controller.

17. The system, as set forth in claim 16, wherein said second level controller comprises:
   a monitor coupled to a plurality of sensors for receiving and monitoring said input signals from said sensors, said monitor producing a first request if at least one input signal fails a predetermined criteria; and
   a guardian for receiving said first request and determining a course of action.

18. The system, as set forth in claim 17, further comprising a consultant, said guardian producing a second request, and said consultant for receiving said second request, performing an analysis and producing information for aiding said determination of a course of action.

19. The system, as set forth in claim 18, wherein said monitor produces a third request and said consultant receives said third request, performing an analysis and producing information for aiding said determination of a course of action.

20. The system, as set forth in claim 16, wherein said third level controller comprises:
   a monitor coupled to a plurality of sensors for receiving and monitoring said input signals from said sensors, said monitor producing a first request if at least one input signal fails a predetermined criteria; and
   a guardian for receiving said first request and determining a course of action.

21. The system, as set forth in claim 20, further comprising a consultant, said guardian producing a second request, and said consultant for receiving said second request, performing an analysis and producing information for aiding said determination of a course of action.

22. The system, as set forth in claim 21, wherein said monitor produces a third request and said consultant receives said third request, performing an analysis and producing information for aiding said determination of a course of action.

23. The system, as set forth in claim 16, further comprising at least one sub-level controller coupled to a second level controller for monitoring and controlling at least one first level controller.

24. The system, as set forth in claim 23, wherein said sub-level controller comprises:
 a monitor coupled to a plurality of sensors for receiving and monitoring said input signals from said sensors, said monitor producing a first request if at least one input signal fails a predetermined criteria; and
 a guardian for receiving said first request and determining a course of action.

25. The system, as set forth in claim 24, further comprising a consultant, said guardian producing a second request, and said consultant receiving said second request, performing an analysis and producing information for aiding said determination of a course of action.

26. The system, as set forth in claim 25, wherein said monitor produces a third request, said consultant receives said third request, performs an analysis and produces information for aiding said determination of a course of action.

27. The system, as set forth in claim 16, wherein said subject of said first level controller is a piece of equipment, said equipment being a part of a process, said second level controller controls and monitors said process. said process being part of a facility, and said third level controller controls and monitors said facility.

28. The system, as set forth in claim 27, further comprising a knowledge database coupled to each of said first, second and third level controllers containing knowledge pertaining to said equipment, process and facility, respectively.

29. The system, as set forth in claim 28, wherein each said first, second, and third level controller comprises:
 a monitor coupled to a plurality of sensors for receiving and monitoring said input signals from said sensors, said monitor producing a first request if at least one input signal fails a predetermined criteria; and
 a guardian for receiving said first request and determining a course of action, and said guardian makes inferences by accessing knowledge stored in said knowledge database.

30. The system, as set forth in claim 29, further comprising a performance history database coupled to each of said first, second and third level controllers containing performance history pertaining to said equipment, process and facility, respectively.

31. The system, as set forth in claim 30, wherein each said first, second, and third level controllers comprises a consultant, said guardian producing a second request, said consultant receiving said second request, performing an analysis, makes inferences by accessing performance history stored in said performance history database, and producing information for aiding said determination of a course of action.

32. The system, as set forth in claim 31, wherein said consultant performs analytic computations such as trend analysis, simulation, optimization and the like to predict probable future problems.

33. The system, as set forth in claim 16, further comprising a consultant, said guardian producing a second request, and said consultant for receiving said second request, performing an analysis and producing information for aiding said determination of a course of action.

34. The system, as set forth in claim 33, wherein said monitor produces a third request and said consultant receives said third request, performing an analysis and producing information for aiding said determination of a course of action.

* * * * *